United States Patent
Razavi et al.

(10) Patent No.: US 7,081,506 B2
(45) Date of Patent: Jul. 25, 2006

(54) ETHYLENE POLYMERIZATION EMPLOYING BIS-IMINO PYRIDINYL TRANSITION METAL CATALYST COMPONENTS

(75) Inventors: Abbas Razavi, Mons (BE); Vladimir Marin, Houston, TX (US); Margarito Lopez, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/691,809

(22) Filed: Oct. 23, 2003

(65) Prior Publication Data

US 2005/0090631 A1    Apr. 28, 2005

(51) Int. Cl.
C08F 4/44 (2006.01)
B01J 31/38 (2006.01)

(52) U.S. Cl. ............. 526/161; 526/171; 526/172; 502/155; 502/167

(58) Field of Classification Search .......... 526/161, 526/171, 172, 352; 502/167, 155
See application file for complete search history.

(56) References Cited

U.S. PATENT DOCUMENTS

| 4,404,344 A | 9/1983 | Sinn et al. |
| 4,767,735 A | 8/1988 | Ewen et al. |
| 5,155,080 A | 10/1992 | Elder et al. |
| 6,613,909 B1 | 9/2003 | Song et al. |

FOREIGN PATENT DOCUMENTS

| EP | 1 125 928 A1 * | 8/2001 |
| EP | 1125928 A1 | 8/2001 |
| EP | 1127897 A2 | 8/2001 |

* cited by examiner

Primary Examiner—Robert D. Harlan
(74) Attorney, Agent, or Firm—William D. Jackson; Tenley R. Krueger

(57) ABSTRACT

Ethylene polymerization processes employing bis-imino pyridinyl transition metal components which exhibit C2, C2v or Cs symmetry. Catalyst components of the same or different symmetries may be employed to control polymerization characteristics and characteristics of the resulting polymer products such as polymer yield and polymer molecular weight. The transition metal catalyst component is characterized by the formula:

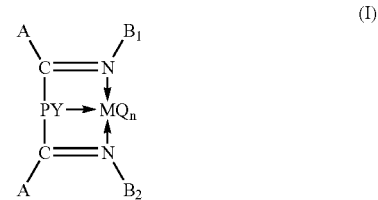

(I)

wherein M is a Group 4–11 transition metal, n is an integer within the range of 1–3, Q is a halogen or a $C_1$–$C_2$ alkyl group, and PY is a pyridinyl group which is coordinated with M through the nitrogen atom of the pyridinyl group. Further, with respect to formula (I), A is a methyl group, a phenyl group, or a substituted phenyl group and $B_1$ and $B_2$ are the same or different aromatic groups depending on the symmetry of the catalyst component. The catalyst component and an activating co-catalyst component are contacted with ethylene in a polymerization reaction zone which is free of hydrogen or contains hydrogen in an amount which is less than 5 mole % of the ethylene under polymerization conditions to produce a polymer product which can be a ethylene homopolymer or a copolymer of ethylene and $C_{3+}$ alpha olefin, specifically an ethylene-propylene copolymer.

36 Claims, 1 Drawing Sheet

ETHYLENE POLYMERIZATION EMPLOYING BIS-IMINO PYRIDINYL TRANSITION METAL CATALYST COMPONENTS

FIELD OF THE INVENTION

This invention relates to the polymerization of ethylene employing bis-imino pyridinyl transition metal catalyst components of C2, C2v and Cs symmetry to produce ethylene polymers and more particularly, to the use of such catalyst components to control polymer yield and molecular weight.

BACKGROUND OF THE INVENTION

Ethylene polymers such as polyethylene homopolymers and ethylene-propylene copolymers may be produced under various polymerization conditions and employing various polymerization catalysts. Such polymerization catalysts include Ziegler-Natta catalysts and non-Ziegler-Natta catalysts, such as metallocenes and other transition metal catalysts which are typically employed in conjunction with one or more co-catalysts. The polymerization catalysts may be supported or unsupported.

Ethylene homopolymers or copolymers may be produced under various conditions in polymerization reactors which may be batch type reactors or continuous reactors. Continuous polymerization reactors typically take the form of loop-type reactors in which the monomer stream is continuously introduced and a polymer product is continuously withdrawn. For example, the production of polymers such as polyethylene or ethylene-propylene copolymers involve the introduction of the monomer stream into the continuous loop-type reactor along with an appropriate catalyst system to produce the desired ethylene homopolymer or copolymer. The resulting polymer is withdrawn from the loop-type reactor in the form of a "fluff" which is then processed to produce the polymer as a raw material in particulate form as pellets or granules. It is often the practice in the production of ethylene homopolymers and ethylene $C_{3+}$ alpha olefin copolymers to employ substantial amounts of molecular weight regulators such as hydrogen to arrive at polymers or copolymers of the desired molecular weight. Typically in the polymerization of ethylene, hydrogen may be employed as a regulator with the hydrogen being introduced into the monomer feed stream in amounts of about 10 mole % and higher of the ethylene feed stream.

SUMMARY OF THE INVENTION

In accordance with the present invention, there are provided ethylene polymerization processes employing bis-imino pyridinyl transition metal components which exhibit C2, C2v and Cs symmetry. The transition metal catalyst components of different symmetries may be employed to control polymerization characteristics and characteristics of the resulting polymer products. Alternatively, transition metal catalyst components of the same symmetry may be employed with variations in the bulk or characteristics of the ligand components being used to control factors such as polymer yield and polymer molecular weight.

In carrying out the present invention, there is provided a transition metal catalyst component having C2, C2v or Cs symmetry and characterized by the formula:

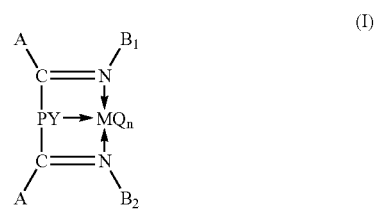

In formula (I), M is a Group 4–11 transition metal, n is an integer within the range of 1–3, Q is a halogen or a $C_1$–$C_2$ alkyl group, and PY is a pyridinyl group which is coordinated with M through the nitrogen atom of the pyridinyl group. Further, with respect to formula (I), A is a methyl group, a phenyl group, or a substituted phenyl group and said catalyst component has $C_2$ symmetry and $B_1$ and $B_2$ are the same and are a 1-naphthyl group, a substituted 1-naphthyl group, a 5,6,7,8-tetrahydro-1-naphthyl group or an anthracenyl group, or said catalyst component exhibits C2v symmetry and $B_1$ and $B_2$ are the same and are a phenyl group or a substituted phenyl group, or said catalyst component exhibits Cs symmetry and $B_1$ is a phenyl or substituted phenyl group and $B_2$ is different from $B_1$ and is a polyphenyl group or terphenyl group. There is also provided an activating co-catalyst component. The catalyst component and said co-catalyst component are contacted with ethylene in a polymerization reaction zone which is free of hydrogen or contains hydrogen in an amount which is less than 5 mole % of the ethylene under polymerization conditions to produce a polymer product by the polymerization of the ethylene followed by recovering said polymer product from the reaction zone. As indicated above, the ethylene polymerization procedure may be carried out using small amounts of hydrogen as a regulator. However, the use of hydrogen or another molecular weight regulator is not necessary and molecular weights can be controlled by controlling the symmetry of the transition metal catalyst component employed in the invention. As noted previously, the polymer product can be a ethylene homopolymer or a copolymer of ethylene and $C_{3+}$ alpha olefin, specifically an ethylene-propylene copolymer.

In one embodiment of the invention, the catalyst component introduced into the polymerization reaction zone comprises a mixture of two catalyst subcomponents, one of which exhibits C2, C2v or Cs symmetry and the other of which exhibits C2, C2v or Cs symmetry which is different from the symmetry of the first subcomponent. In a further embodiment of the invention, a catalyst component is employed which exhibits C2 symmetry to produce a polymer of lower molecular weight than the polymer produced by a corresponding catalyst component of C2 symmetry in which the substituents A are of a higher molecular weight than the substituents A of the catalyst component, or in which the groups $B_1$ and $B_2$ are less aromatic than the groups $B_1$ and $B_2$ of the catalyst component. Where a catalyst component exhibiting Cs symmetry is employed, the process produces a polymer of higher molecular weight than the polymer produced by a corresponding catalyst component of Cs symmetry in which at least one of the groups $B_1$ and $B_2$ is less bulky than the corresponding group $B_1$ and $B_2$ of the catalyst component. In a further embodiment of the invention employing a catalyst component which exhibits C2v symmetry, a polymer product of higher molecular weight is produced than the polymer produced by a corresponding catalyst component of C2v symmetry in which substituents A are of a lower molecular weight than the substituents A of the catalyst component.

In another aspect of the invention, the catalyst component exhibits C2 symmetry to produce a polymer product having a lower molecular weight than the polymer product produced by polymerization under the same conditions with a catalyst component having Cs or C2 symmetry. Where the catalyst component exhibits C2v symmetry, the polymerization product is operated under conditions to produce a polymer product having a molecular weight greater than that produced by the reaction zone under corresponding conditions with the catalyst having Cs symmetry.

In a preferred embodiment of the invention, M in formula (I) is a transition metal selected from the Group 8–10 of the Periodic Table of Elements. Preferably, M is iron or cobalt, n is 2 and Q is chlorine or bromine.

As noted previously, hydrogen need not be employed in the polymerization procedure. Where hydrogen is employed, it preferably is introduced in an amount to provide a hydrogen-ethylene mole ratio within the range of 0.001–0.02. The hydrogen can be employed to increase the activity of the catalyst component relative to the activity of the catalyst component without the introduction of hydrogen.

In another embodiment of the invention, there is provided an ethylene polymerization process using first and second transition metal catalyst components. The first transition metal catalyst component is characterized by the formula (I) as described above. This transition metal catalyst component, along with a first activating co-catalyst component, is contacted with ethylene in a polymerization reaction zone under polymerization conditions to produce a first polymer product by the polymerization of the ethylene. This polymer product is recovered from the reaction zone. There is further provided a second transition metal catalyst component of C2, C2v or Cs symmetry which is different than said first transition metal catalyst component and is characterized by the formula:

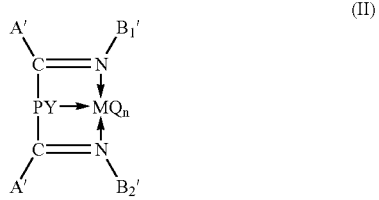

(II)

wherein M is a transition metal selected from Groups 4–11 of the Periodic Table of Elements, n is an integer of from 1–3, Q is a halogen or a $C_1$–$C_2$ alkyl group, PY is a pyridinyl group, which is coordinated with M through the nitrogen atom of said pyridinyl group, A' is a methyl group, a phenyl group, or a substituted phenyl group and said second catalyst component has $C_2$ symmetry and $B_1'$ and $B_2'$ are the same and are a 1-naphthyl group, a substituted 1-naphthyl group, a 5,6,7,8-tetrahydro-1-naphthyl group or an anthracenyl group or said second catalyst component exhibits C2v symmetry and $B_1'$ and $B_2'$ are the same and are a phenyl group or a substituted phenyl group or said second catalyst component exhibits Cs symmetry and $B_1'$ is a phenyl or substituted phenyl group and $B_2'$ is different from $B_1'$ and is a polyphenyl group or terphenyl group. A second activating co-catalyst component is provided which may be the same as or different from the first co-catalyst component. The second catalyst component and the second co-catalyst component are contacted with ethylene in a polymerization reaction zone under polymerization conditions to produce a second polymer product which has a different molecular weight characteristic than the corresponding molecular weight characteristic of the first polymer product. This second polymer product is then recovered from the polymerization reaction zone. In one embodiment of the invention, the first catalyst component has C2 symmetry and the second catalyst component has Cs or C2v symmetry to produce a second polymer product which has a higher molecular weight than the first polymer product. In another embodiment, the first catalyst component has C2 or Cs symmetry and the second catalyst component has C2v symmetry to produce a second polymer product having a higher molecular weight than the first polymer product. In yet a further embodiment of the invention, both of the first and second catalyst components have C2 symmetry and the substituent A' of the second catalyst component is bulkier than the substituent A of the first catalyst component to produce a second polymer product of lower molecular weight than that of the first polymer product. In another embodiment of the invention employing catalyst components of C2 symmetry, the groups $B_1'$ and $B_2'$ of the second catalyst component have a lower aromaticity than the groups $B_1$ and $B_2$ to produce a second polymer product having a lower molecular weight than the first polymer product.

In yet another embodiment of the invention, the catalysts each have C2v symmetry. Here, the substituent A' of the second component is bulkier than the substituent A of the first catalyst component with the production of a second polymer product which has a higher molecular weight than that of the first polymer product. In a further embodiment of the invention, where the first and second catalyst components have Cs symmetry, the group $B_1'$ of the second component has a bulk greater than the group $B_1$ of the first catalyst component. In addition or alternatively, where the catalyst components have Cs symmetry, the group $B_2'$ of the second catalyst component has a bulk greater than the bulk of the group $B_2$ of first catalyst component. In both cases, the second polymer product has a higher molecular weight than the molecular weight of the first polymer product. In yet a further embodiment of the invention, there is provided an ethylene polymerization process involving a first transition metal catalyst component characterized by formula (I) above and a second transition metal catalyst component characterized by formula (I) which is different from the first transition metal catalyst component. The first catalyst component is contacted with a first activating co-catalyst component and ethylene in a polymerization reaction zone to produce a first ethylene polymer product. The second catalyst component, which is different from the first transition metal component and an activating co-catalyst component are introduced into a reaction zone which is operated under polymerization conditions to produce a polymer product by polymerization of the ethylene. In one embodiment of the invention, the first and second catalyst components are introduced into the polymerization reaction zone as a mixture. In another embodiment of the invention, the first and second catalyst components are introduced into the polymerization reaction zone sequentially to produce two different polymer products.

BRIEF DESCRIPTION OF THE DRAWING

The drawing is a graphical presentation showing molecular weight distributions of polyethylene produced by a C2 symmetric catalyst, a Cs symmetric catalyst and a C2v symmetric catalyst.

DETAILED DESCRIPTION OF INVENTION

Figure 1:
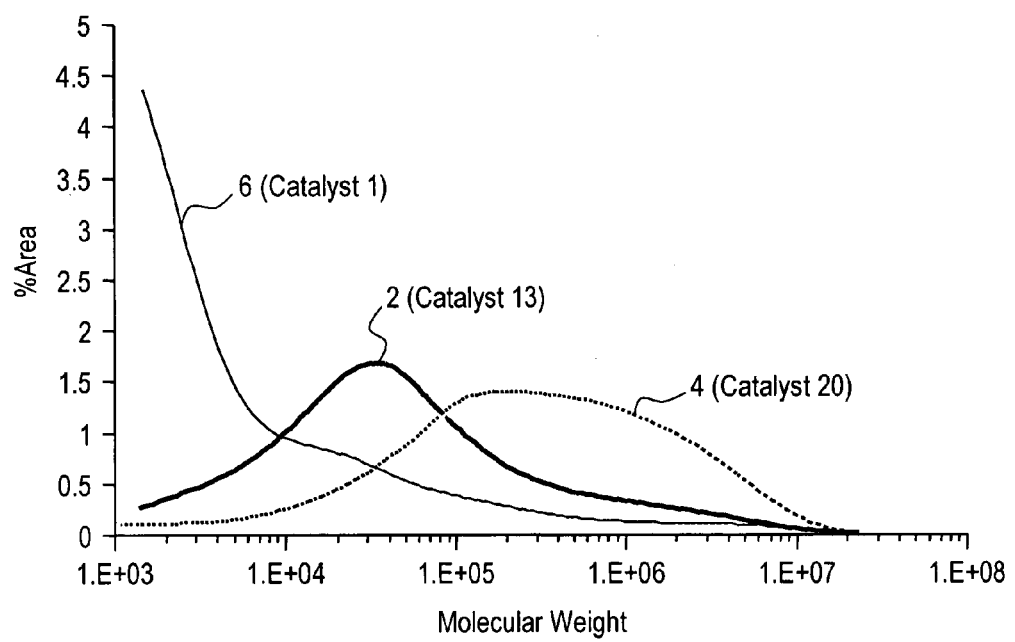

The present invention involves pyridinyl-bridged bis-imino transition metal catalysts having C2, C2v and Cs symmetry and their use in the polymerization of ethylene. The ethylene may be polymerized, either through homopolymerization or copolymerization with a $C_{3+}$ alpha olefin, specifically propylene through 1-hexene. The C2, C2v and Cs symmetric catalyst components of the present invention incorporate transition metals from Groups 4–11 of the Periodic Table of Elements (new notation) and more particularly, transition metals from Groups 8–11 of the Periodic Table of Elements. Preferred transition metals for use in the catalyst components of the present invention are iron, cobalt, nickel and copper with iron and cobalt being particularly preferred.

The transition metal catalyst components employed in carrying out the present invention incorporate pyridinyl-linked bis-imino ligands which chelate to the transition metal center provided by transition metal M as shown by formula (I):

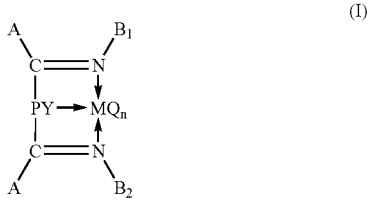

(I)

In formula (I), Q is a halogen or a $C_1$–$C_2$ alkyl group. Preferably, Q will take the form of chlorine or bromine with M being iron or cobalt and n being 2. A is a methyl group, a phenyl group, or a substituted phenyl group. For C2 symmetry, $B_1$ and $B_2$ are the same and are a 1-naphthyl group, a substituted 1-naphthyl group, a 5,6,7,8-tetrahydro-1-naphthyl group or an anthracenyl group as discussed below. The groups $B_1$ and $B_2$ may be meso or racemic with respect to the transition metal center.

For catalysts exhibiting C2v symmetry, $B_1$ and $B_2$ are the same and may be a phenyl group or a substituted phenyl group, including a terphenyl group. For the catalyst exhibiting C2v symmetry, the aromatic groups $B_1$ and $B_2$ are symmetrical with respect to a plane of symmetry through the coordinating nitrogen atom as described below with respect to Cs symmetry.

For the transition metal catalyst component exhibiting Cs symmetry, $B_1$ and $B_2$ are different. $B_1$ is a phenyl or substituted phenyl group and $B_2$ is a polyphenyl group, and preferably a terphenyl group. Thus, in the case of Cs symmetry, the transition metal catalyst component incorporates pyridinyl-linked bis-imino ligand structures which are unbalanced and incorporate a mononuclear aromatic group linked to one nitrogen atom and a polynuclear aromatic group linked to the other nitrogen atom. The mononuclear and polynuclear aromatic groups may be substituted or unsubstituted, but if substituted, each aromatic group is symmetrical with respect to each group's respective coordinating nitrogen atom to provide a ligand structure having Cs symmetry. In Cs symmetry, the plane of symmetry extends through the transition metal and nitrogen atoms of the bis-imino ligand as shown by the following diagram of a bridged phenyl-terphenyl structure as indicated below:

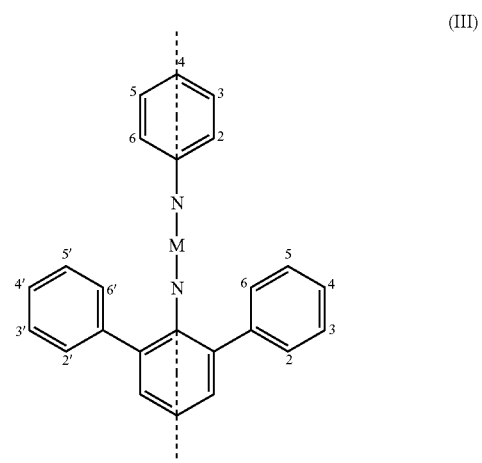

(III)

In diagram (III), the plane of symmetry is indicated by the broken line and is perpendicular to the plane of the paper in which the phenyl and terphenyl groups are schematically shown. With respect to the phenyl group, Cs symmetry is observed if the phenyl group is unsubstituted, mono-substituted at the 4 (directly distal position), di-substituted at the 2,6 positions with the same substituents, or at the 3,5 positions with the same substituents. With respect to the terphenyl group, Cs symmetry is maintained if the terphenyl group is unsubstituted, di-substituted at the distal positions 4 and 4' of the substituent phenyl groups, or substituted on the substituent phenyl groups at the 2 and 2' positions with the same substituent groups, and at the 6 and 6' positions with the same substituent groups, which may be the same or different than the substituents at the 2 and 2' positions. Diagram (III), which schematically shows a phenyl-terphenyl ligand structure in which the substituent phenyl groups are substituted on the primary benzyl group of the terphenyl group at the proximal positions with respect to the nitrogen linkage, is illustrative of embodiments of the invention such as shown by compounds 12–19 below.

As noted previously, a preferred application of the present invention involves the use of a catalyst of C2, C2v or Cs symmetry in which the transition metal is iron. This embodiment of the invention is illustrated by the following formula:

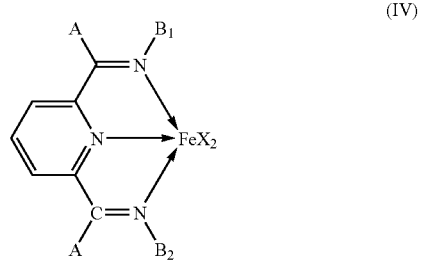

(IV)

According to the present invention, a catalyst component of formula (IV) with N,N,N bis-imino-pyridyl ligand, chelating to the iron center with X=Cl or Br, substituents A, B$_1$, and B$_2$ are selected to provide a catalyst component that has C2, Cs or C2v symmetry of the complex. Examples of C2, C2v and Cs symmetric catalyst components are shown, but not limited to the following compounds 1 through 24.

In the following exemplary compounds, a methyl group is indicated by

an isopropyl group by

and a tertiary butyl group by

Aromatization of the aromatic group is indicated by

and dearomatization, as in the case of a 5,6,7,8-tetrahydronaphthalene is indicated by

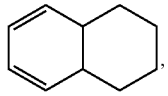

or by

C2 Symmetry

A=methyl, phenyl or substituted phenyl.
B$_1$=B$_2$=1-naphthyl; substituted-1-naphthyl; 5,6,7,8-tetrahydro-1-naphthyl; anthracenyl group.

1

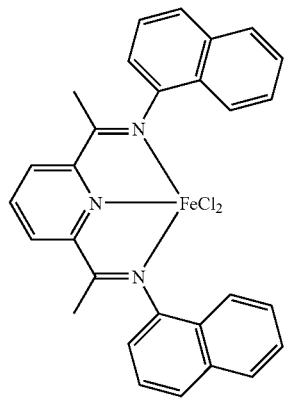

2

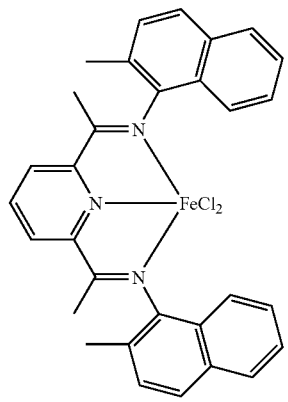

3

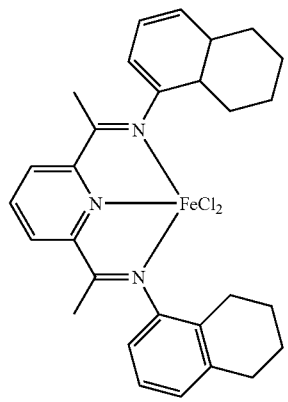

4

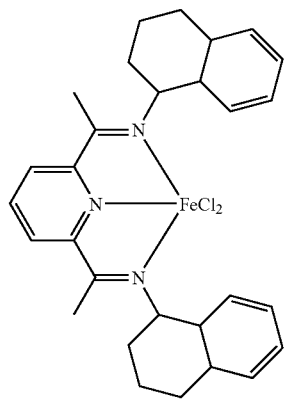

-continued
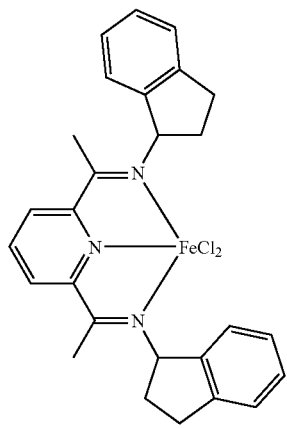
5
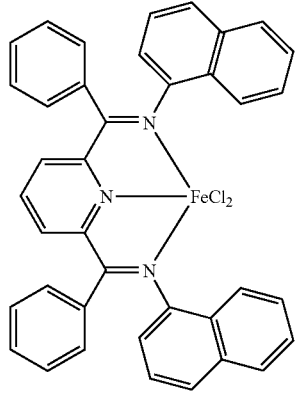
6
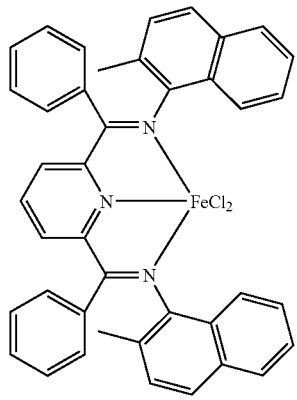
7
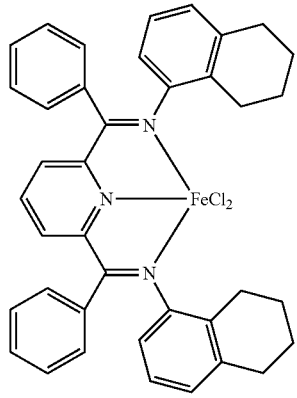
8
-continued
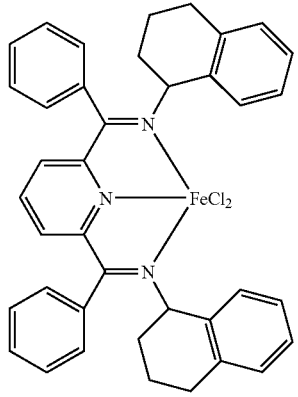
5
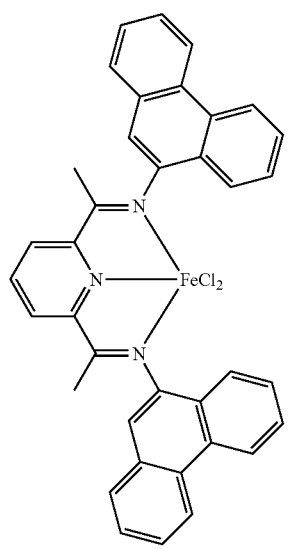
9
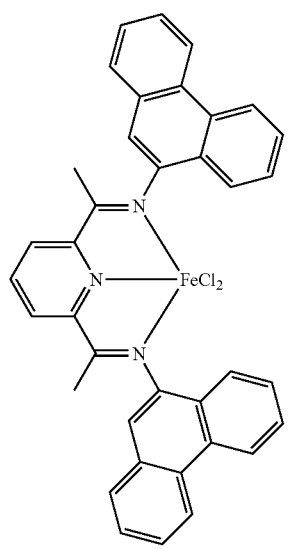
10
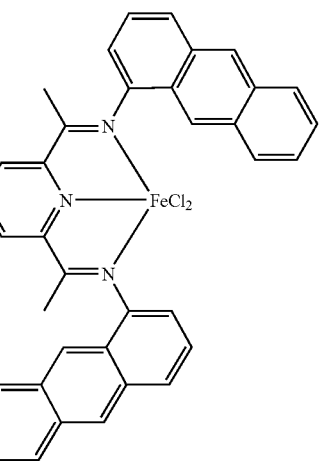
11
As indicated by the above examples, the ligand structure may have a meso configuration, as indicated by compounds 1–4 and 6–10 or it may have a racemic configuration, as indicated by compounds 5 and 11.

Cs Symmetry
A=methyl, phenyl or substituted phenyl.
B₁ is not equivalent to B₂.
B₁=phenyl or substituted phenyl group.
B₂=polyphenyl group, terphenyl group.
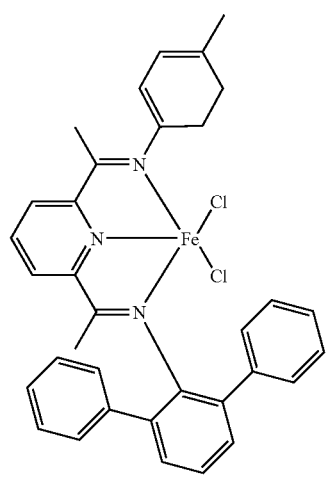
12
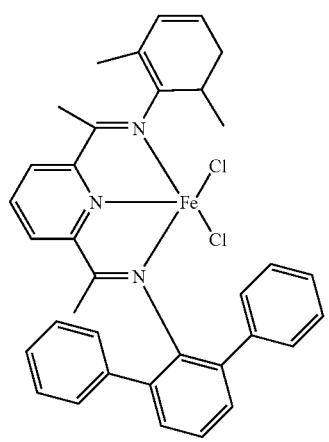
13
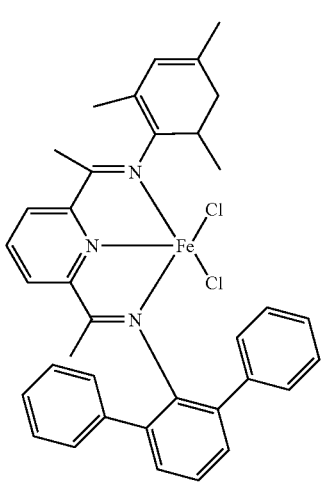
14
-continued
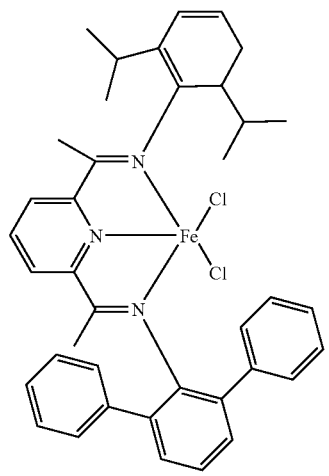
15
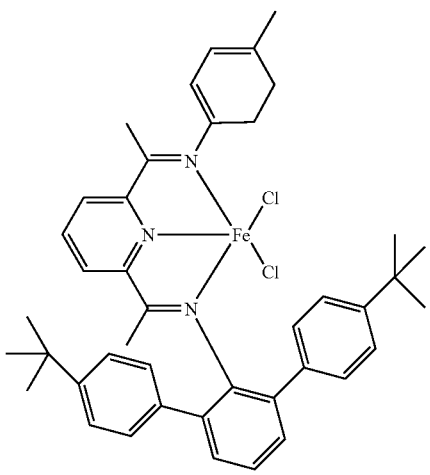
16
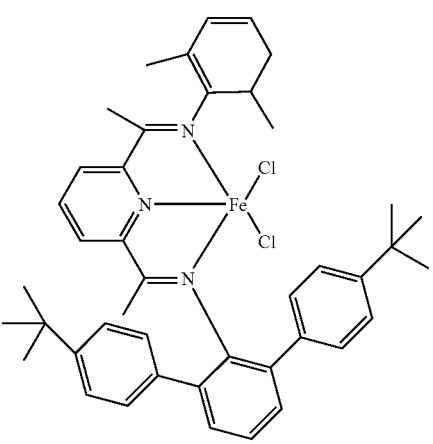
17

-continued
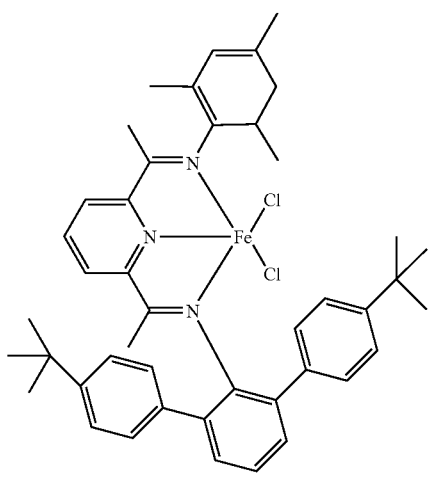
18
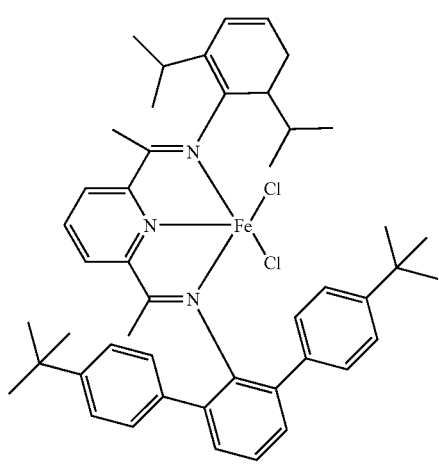
C2v Symmetry
A=methyl, phenyl or substituted phenyl.
B₁=B₂=phenyl or substituted phenyl group.
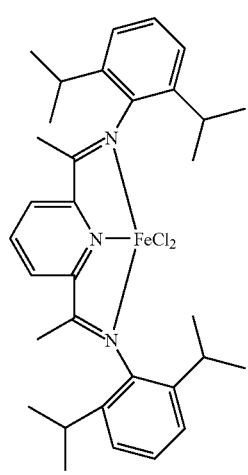
20
-continued
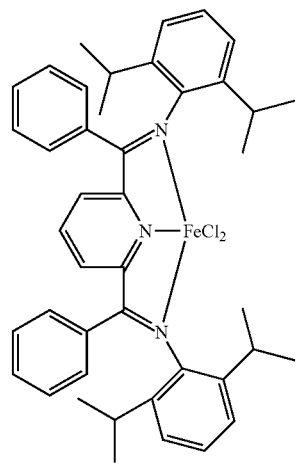
21
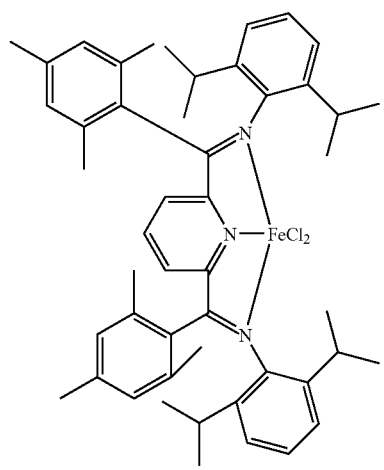
22
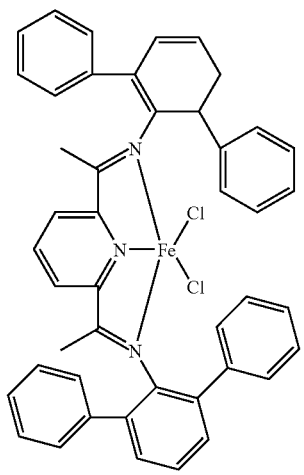
23

-continued

24

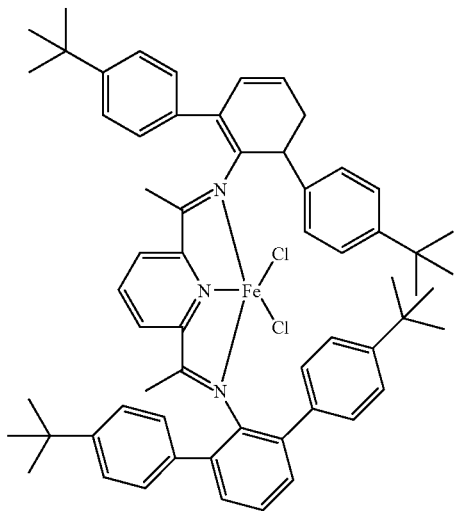

In employing the catalyst components of the present invention in polymerization procedures, they are used in conjunction with an activating co-catalyst. Suitable activating co-catalysts may take the form of co-catalysts such are commonly employed in metallocene-catalyzed polymerization reactions. Thus, the activating co-catalyst may take the form of an alumoxane co-catalyst. Alumoxane co-catalysts are also referred to as aluminoxane or polyhydrocarbyl aluminum oxides. Such compounds include oligomeric or polymeric compounds having repeating units of the formula:

(V)

where R is an alkyl group generally having 1 to 5 carbon atoms. Alumoxanes are well known in the art and are generally prepared by reacting an organo-aluminum compound with water, although other synthetic routes are known to those skilled in the art. Alumoxanes may be either linear polymers or they may be cyclic, as disclosed for example in U.S. Pat. No. 4,404,344. Thus, alumoxane is an oligomeric or polymeric aluminum oxy compound containing chains of alternating aluminum and oxygen atoms whereby the aluminum carries a substituent, preferably an alkyl group. The structure of linear and cyclic alumoxanes is generally believed to be represented by the general formula —(Al(R)—O—)-m for a cyclic alumoxane, and $R_2$Al—O—(Al(R)—O)m-$AlR_2$ for a linear compound wherein R independently each occurrence is a $C_1$–$C_{10}$ hydrocarbyl, preferably alkyl or halide and m is an integer ranging from 1 to about 50, preferably at least about 4. Alumoxanes also exist in the configuration of cage or cluster compounds. Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutylaluminum, with water yields so-called modified or mixed alumoxanes. Preferred alumoxanes are methylalumoxane and methylalumoxane modified with minor amounts of other higher alkyl groups such as isobutyl. Alumoxanes generally contain minor to substantial amounts of the starting aluminum alkyl compounds. The preferred co-catalyst, prepared either from trimethylaluminum or tri-isobutylaluminum, is sometimes referred to as poly (methylaluminum oxide) and poly(isobutylaluminum oxide), respectively.

The alkyl alumoxane co-catalyst and transition metal catalyst component are employed in any suitable amounts to provide an olefin polymerization catalyst. Suitable aluminum transition metal mole ratios are within the range of 10:1 to 20,000:1 and preferably within the range of 100:1 to 2,000:1. Normally, the transition metal catalyst component and the alumoxane, or other activating co-catalyst as described below, are mixed prior to introduction in the polymerization reactor in a mode of operation such as described in U.S. Pat. No. 4,767,735 to Ewen et al. The polymerization process may be carried out in either a batch-type, continuous or semi-continuous procedure, but preferably polymerization of the ethylene will be carried out in a loop-type reactor of the type disclosed in the aforementioned U.S. Pat. No. 4,767,735. Typical loop-type reactors include single loop reactors or so-called double loop reactors in which the polymerization procedure is carried in two sequentially connected loop reactors. As described in the Ewen et al. patent, when the catalyst components are formulated together, they may be supplied to a linear tubular pre-polymerization reactor where they are contacted for a relatively short time with the pre-polymerization monomer (or monomers) prior to being introduced into the main loop type reactors. Suitable contact times for mixtures of the various catalyst components prior to introduction into the main reactor may be within the range of a few seconds to 2 days. For a further description of suitable continuous polymerization processes which may be employed in carrying out the present invention, reference is made to the aforementioned U.S. Pat. No. 4,767,735, the entire disclosure of which is incorporated herein by reference.

Other suitable activating co-catalysts which can be used in carrying out the invention include those catalysts which function to form a catalyst cation with an anion comprising one or more boron atoms. By way of example, the activating co-catalyst may take the form of triphenylcarbenium tetrakis (pentafluorophenyl) boronate as disclosed in U.S. Pat. No. 5,155,080 to Elder et al. As described there, the activating co-catalyst produces an anion which functions as a stabilizing anion in a transition metal catalyst system. Suitable noncoordinating anions include [W(PhF$_5$)]$^-$, [Mo(PhF$_5$)]$^-$ (wherein PhF$_5$ is pentafluorophenyl), [ClO$_4$]$^-$, [S$_2$O$_6$]$^-$, [PF$_6$]$^-$, [SbR$_6$]$^-$, [AlR$_4$]$^-$ (wherein each R is independently Cl, a $C_1$–$C_5$ alkyl group preferably a methyl group, an aryl group, e.g. a phenyl or substituted phenyl group, or a fluorinated aryl group). Following the procedure described in the Elder et al. patent, triphenylcarbenium tetrakis(pentafluorophenyl)boronate may be reacted with pyridinyl-linked bis-imino ligand of the present invention in a solvent, such as toluene, to produce a coordinating cationic-anionic complex. For a further description of such activating co-catalyst, reference is made to the aforementioned U.S. Pat. No. 5,155,080, the entire disclosure of which is incorporated herein by reference.

In addition to the use of an activating co-catalyst, the polymerization reaction may be carried out in the presence of a scavenging agent or polymerization co-catalyst which is added to the polymerization reactor along with the catalyst component and activating co-catalyst. These scavengers can be generally characterized as organometallic compounds of metals of Groups IA, IIA, and IIIB of the Periodic Table of Elements. As a practical matter, organoaluminum compounds are normally used as co-catalysts in polymerization reactions. Specific examples include triethylaluminum, tri-isobutylaluminum, diethylaluminum chloride, diethylaluminum hydride and the like. Scavenging co-catalysts normally employed in the invention include methylalumoxane (MAO), triethylaluminum (TEAL) and tri-isobutylaluminum (TIBAL).

As described previously, molecular weight control of the polyethylene product can be achieved through the use of a catalyst having C2 symmetry, Cs symmetry and C2v symmetry. In general, the use of catalyst exhibiting C2 symmetry is effective in providing high yields of ethylene polymers having relatively low molecular weights within the range of 500–100,000. In using the C2 symmetric catalyst components, molecular weight control can be effected by changing the bulk of the substituents A, or by changing the aromaticity of the substituents $B_1$ and $B_2$ of formula (1). Thus, molecular weight can be decreased when employing C2 symmetric catalyst components by increasing the bulk of the substituents A or by dearomatization of the substituents $B_1$ and $B_2$.

The Cs symmetric catalyst components provide for high yields of ethylene polymers or copolymers with intermediate molecular weights within the range of 100,000–650,000. When using Cs symmetric catalyst components, molecular weight control can be effected by increasing the size and number of electron donative substituents of $B_1$ and/or $B_2$.

The C2v symmetric catalyst components are effective in producing high yields of ethylene polymers or copolymers having relatively high molecular weights within the range of 200,000–1,500,000. For the catalyst components of C2v symmetry, molecular weight can be effected by regulating the bulk of the substituents A, with an increase in bulk of these substituents A corresponding to an increase in molecular weight of the resulting polymer product.

For the C2, Cs and C2v symmetric catalyst components, molecular weight control can be effected without the need of using substantial amounts of molecular weight regulators such as hydrogen. Small amounts of hydrogen can be, but need not be, used to control molecular weight. Where hydrogen is used for this purpose, it will be used in amount of less than 5 mole % based upon the ethylene feed and usually within an amount of no more than 2 mole % of the ethylene feed. As indicated by the experimental work described in greater detail below, these very small amounts of hydrogen, which are much less than the amount of hydrogen typically used for molecular weight control, can be used effectively in the present invention.

The following examples 1–30 are illustrative of polymerization procedures which can be carried out in accordance with the present invention. In Examples 1–7, 15–17 and 21–24, the catalyst component had C2 symmetry. In Examples 8–10 and 25–28, the catalyst component exhibited C2v symmetry and in Examples 11–14, 18–20 and 29 and 30, the catalyst component exhibited Cs symmetry. As indicated by the following examples, the molecular weight of the polyethylene produced with the catalyst component progressively indicates a general progression in increase when going from C2 symmetry to Cs symmetry to C2v symmetry. FIG. 1 illustrates the effect of the type of symmetry of the catalyst component on the molecular weight of the polyethylene produced. In FIG. 1, molecular weight distributions are plotted with the percent of the area, A, on the ordinate and the molecular weight in a logarithmic scale on the abscissa. In FIG. 1, curve 2 is a plot of the molecular weight distribution of the polyethylene produced by a C2 symmetric catalyst component of compound 1, curve 4 is a plot of the molecular weight distribution of polyethylene produced by the Cs symmetric catalyst 13, and curve 6 is a plot of the molecular weight distribution of polyethylene produced by the catalyst component 20, exhibiting C2v symmetry.

In addition to effecting control of the molecular weight of polyethylene by selection of catalyst symmetry, the molecular weight produced by C2, C2 and C2v symmetric catalyst can also be controlled by the addition of hydrogen and 1-hexene. An addition of hydrogen during the ethylene polymerization increases the activities of the C2, Cs and C2v catalysts and increases the molecular weight of the polyethylene produced (ex. 15 and 16 for C2 symmetry; ex. 18 and 19 for Cs symmetry; ex. 21 and 22 for C2 symmetry; ex. 25 and 26 for C2v symmetry). An addition of 1-hexene to polymerization reactor results in decreasing molecular weight (mostly due to a copolymerization process) (ex. 21 and 23 for C2 symmetry; ex. 25 and 27 for C2v symmetry). An addition of hydrogen and 1-hexene results in production of polyethylene with low molecular weight in higher yields.

EXAMPLES 1–7

Cs Symmetry

In examples 1–7, the polymerizations were conducted using an Endeavor reactor. For each catalyst, a stock solution was made by weighing out a specified amount of the iron catalyst in a 20 ml Wheaton bottle and dissolving it in 3 ml of 1,2-dichloroethane followed by diluting it with 17 ml toluene to make a total volume of 20 ml.

Each polymerization was conducted by injecting a specified amount of the stock catalyst solution that contained 6.08E-05 mmoles of catalyst. The catalyst was then activated with an MAO solution (30 wt. % in toluene) to provide an Al/Fe ratio of 1,000. Isobutane solvent was then added to the reactor and then it was pressured up with ethylene and keeping a total ethylene concentration of 8.0 wt. %. The reactor was heated to 50° C. for 30 to 60 minutes. The polymerizations were terminated by venting the reactors. Molecular weight characterizations of polymers produced were obtained by Waters Alliance GPC2000 with refractive index detection. The results of Examples 1–7 are shown in Table 1. In Table 1, the second column provides a descriptive identification of the catalyst, the third column identifies the catalyst by the number structures disclosed previously, the fourth column shows the activity of the catalyst in grams of polyethylene per grams of catalyst component per hour, the fifth and sixth columns show the number average molecular weight and the weight average molecular weight, respectively, the seventh column presents the "z" average molecular weight (a measure of the high molecular tail of the distribution curve), and the last column shows the molecular weight distribution.

TABLE 1

Ethylene Homopolymerizations using C2 Symmetric Catalysts in Endeavor Reactor (50° C., i-butane, Fe/Al = 1/1,000, 30 min)

| Examples | Catalyst | Catalyst Number | Activity, g PE/gCat/h | Mn | Mw | Mz | Mw/Mn |
|---|---|---|---|---|---|---|---|
| 1 | Bis-naphthyl | 1 | 95,349 | 3,000 | 93,951 | 2,793,905 | 31.3 |
| 2 | Bis-2-Me-naphthyl | 2 | 56,899 | 8,465 | 91,073 | 2,117,993 | 10.8 |
| 3 | Bis-TH-naphthyl | 3 | 128,524 | 2,480 | 8,791 | 39,846 | 3.5 |
| 4 | DibenzPy-bis-naphthyl | 6 | 10,011 | 3,708 | 9,969 | 48,210 | 6.5 |
| 5 | DibenzPy-bis-2-Me-naphthyl | 7 | 56,899 | 3,708 | 9,969 | 48,210 | 2.7 |
| 6 | DibenzPy-bis-TH-naphthyl | 8 | 54,980 | 2,286 | 4,561 | 13,964 | 2.0 |
| 7 | Bis-phen | 10 | 99,583 | 2,902 | 11,606 | 51,000 | 4.0 |

EXAMPLES 8–10

C2v Symmetry

The polymerization procedure used in examples 8–10 is the same as in Examples 1–7. The results are shown in Table 2.

TABLE 2

Ethylene Homopolymerizations using C2v catalysts in Endeavor Reactor (50° C., i-butane, Fe/Al = 1/1,000, 30 min)

| Examples | Catalyst | Catalyst Number | Activity, g PE/gCat/h | Mn | Mw | Mz | Mw/Mn |
|---|---|---|---|---|---|---|---|
| 8 | i-Pr2,i-Pr2 | 20 | 40,452 | 25,919 | 639,215 | 5,506,591 | 24.7 |
| 9 | DiBenzPy(i-Pr2,i-Pr2) | 21 | 28,541 | 68,451 | 906,132 | 4,107,013 | 13.2 |
| 10 | DiMesPy(i-Pr2,i-Pr2) | 22 | 8,529 | 33,339 | 1,070,206 | 4,474,094 | 32.1 |

EXAMPLES 11–14

Cs Symmetry

The polymerization procedure for examples 11–14 is the same as in examples 1–7. The results are shown in Table 3.

TABLE 3

Ethylene Homopolymerizations using Cs Symmetric Catalysts in Endeavor Reactor (50° C., i-butane, Fe/Al = 1/1000, 30 min)

| Examples | Catalyst | Catalyst Number | Activity, g PE/gCat/h | Mn | Mw | Mz | Mw/Mn |
|---|---|---|---|---|---|---|---|
| 11 | Me3Ph2 | 14 | 45,037 | 19,215 | 626,099 | 4,889,169 | 32.6 |
| 12 | Me2Ph2 | 13 | 23,869 | 12,532 | 200,991 | 2,893,010 | 16.0 |
| 13 | i-Pr2Ph2 | 15 | 35,351 | 9,317 | 309,451 | 4,257,665 | 33.2 |
| 14 | Me2(t-BuPh)2 | 17 | 42,982 | | | | |

EXAMPLES 15–20

C2, Cs Symmetry

The polymerizations for examples 15–20 were performed in a 4L zipperclave reactor. The reactor was charged with i-butene (1,200 g) and ethylene (100 L). A stock solution of the iron catalyst was prepared by adding MAO (30 wt. % in toluene) to the catalyst sample. The stock solution had an Al/Fe mole ratio of 1,000. Each catalyst was completely soluble and resulted in a dark reddish-brown solution. For the polymerization run, a desired amount of the catalyst stock solution was charged into a bomb plus an additional amount of toluene to provide an amount of about 5.0 ml. This bomb was identified as bomb #2. Then, 1,000 equivalents of MAO (30 wt. % MAO in toluene) plus an additional amount of toluene to provide a total of about 5.0 ml of solution was charged into another bomb identified as bomb #1. Bomb #1 was first charged as a scavenger into the reactor that contained 7 wt. % of ethylene in isobutane at the specified temperature of 35° C. After approximately 3 minutes, bomb #2 was charged into the reactor at 35° C. The total Al/Fe mole ratio in the polymerization was 2,000. The reaction was left at the set temperature of 35° C. until the exotherm began to decrease. As soon as the exotherm started to decrease, the reaction temperature was set to the desired temperature. The results of examples 15–20 are shown in Table 4. In Table 4, the third column shows the amount of catalyst used and the fourth and fifth columns show the temperature in ° C. and the time and minutes of the polymerization run. The amount of hydrogen, where used, as a mole fraction of the ethylene is shown in the sixth column, and the yields in grams are shown in the seventh column, along with the activity of the catalyst in grams of polyethylene per grams of catalyst per hour in the eighth column. The last four columns present data for Mn, Mw, Mz and Mw/Mn, as described previously.

TABLE 4

Ethylene Homopolymerizations in 4L Bench Reactor (50° C., i-butane, Fe/Al = 1/1000, 30 min, 2 mg of catalyst). Hydrogen and Temperature Effect on MW

| Ex. | Catalyst | Amount, mg | T, ° C. | Time, min | $H_2/C2$ | Yi Id, g | Activity, g PE/gCat/h | Mn | Mw | Mz | Mw/Mn |
|---|---|---|---|---|---|---|---|---|---|---|---|
| 15 | 1 Bis-naphthyl | 2.0 | 50 | 60 | 0 | 272 | 73,440 | 2,800 | 19,314 | 164,368 | 6.9 |
| 16 | 1 | 2.0 | 50 | 60 | 0.006 | 228 | 61,500 | 4,114 | 68,464 | 1,014,445 | 16.7 |
| 17 | 1 | 2.0 | 80 | 60 | 0 | 106 | 28,620 | 2,750 | 11,268 | 61,696 | 4.1 |
| 18 | 13 Me2Ph2 | 2.0 | 50 | 60 | 0 | 29 | 8,990 | 26,505 | 253,921 | 1,987,142 | 9.6 |
| 19 | 13 | 2.0 | 50 | | 0.006 | 35 | 10,850 | 24,648 | 282,117 | 2,738,669 | 11.4 |
| 20 | 13 | 2.0 | 80 | 60 | 0 | 16 | 4,960 | 18,056 | 138,612 | 895,348 | 7.7 |

EXAMPLES 21–30

C2, C2v, Cs Symmetry

The polymerization procedure used in examples 21–30 is the same as in Examples 15–20. The results produced in examples 15–20 are summarized in Table 5. Table 5 corresponds to the data presented in Table 4, with the exception that a column showing the ml of 1-hexene (where used) is included as column six.

EXAMPLE 31

Preparation of 2,6-bis[1-(2-Me-1-naphthylimino)ethyl]pyridine 2,6-Diacethylpyridine (0.33 g, 2.0 mmol) and 2-methyl-1-iminonaphthylamine (1.99 g, 10.7 mmol) were added to a round-bottom flask with 20 ml of ethanol. 5 Drops of glacial acetic acid were added, the flask was sealed and the solution was stirred for 4 days. The solvent was removed under vacuum. The ligand was isolated after column chromatography (hexane/ethyl acetate=5/1) to provide a yield of 0.42 g.

EXAMPLE 32

Preparation of 2,6-bis[1-(2-Me-1-naphthylimino)ethyl]pridine iron dichloride (complex 2)

The ligand from example 31 (0.42 g, 0.95 mmol) was dissolved in THF (20 ml). $FeCl_2$ (120.9 mg, 0.95 mmol) was added to the ligand solution. The reaction mixture was stirred for 2 hours at room temperature. A dark blue-green suspension was formed. The solvent was removed under vacuum and the solid residue was crystallized from $CH_2Cl_2$/hexane to give the desired complex 2.

TABLE 5

Ethylene Homopolymerization and Copolymerization with Hexene-1 in 4L Bench Reactor (80° C., i-butane, Fe/Al = 1/1000)

| Ex. | Catalyst | Amount, mg | Time, min | $H_2/C_2$ | Hexene-1, ml | Yield, g | Activity, g PE/gCat/h | Mn | Mw | Mz | Mw/Mn |
|---|---|---|---|---|---|---|---|---|---|---|---|
| 21 | 2 Bis-2-Me-naphthyl | 0.15 | 30 | 0 | 0 | 283 | 3,773,333 | 5,500 | 66,917 | 1,597,325 | 12.2 |
| 22 | 2 | 0.15 | 30 | 0.005 | 0 | 550 | 7,333,333 | 5,704 | 77,457 | 2,175,146 | 13.6 |
| 23 | 2 | 0.15 | 30 | 0 | 40 | 517 | 6,893,333 | 5,363 | 30,397 | 578,794 | 5.7 |
| 24 | 2 | 0.15 | 30 | 0.006 | 40 | 546 | 7,280,000 | 5,369 | 34,980 | 807,798 | 6.5 |
| 25 | 21 iBenzPy(iPr2)(iPr2) | 1.0 | 40 | 0 | 0 | 3 | 4,500 | 13,394 | 121,401 | 1,524,929 | 9.1 |
| 26 | 21 | 1.0 | 48 | 0.005 | 0 | 9 | 11,250 | 17,519 | 186,717 | 2,362,456 | 10.7 |
| 27 | 21 | 5.0 | 30 | | 40 | 14 | 5,600 | 8,671 | 97,177 | 1,494,585 | 11.2 |
| 28 | 21 | 3.0 | 30 | 0.006 | 40 | 23 | 15,541 | 9,788 | 93,139 | 1,322,515 | 9.52 |
| 29 | 14 (Me3)(Ph2) | 0.5 | 30 | 0 | 0 | 39 | 156,000 | 14,928 | 243,771 | 2,271,752 | 16.3 |
| 30 | 17 (Me2)(tBuPh2) | 0.5 | 30 | 0 | 0 | 259 | 1,195,385 | 18,640 | 273,711 | 2,468,959 | 14.7 |

The following examples indicate the preparation of pyridinyl bis-imino ligand structures and their corresponding iron dichloride complexes. Examples 31–44 exhibit the preparation of complexes having C2 symmetry, examples 45–52 exhibit the preparation of complexes having Cs symmetry, and examples 53–56 exhibit the preparation of catalyst components having C2v symmetry.

EXAMPLE 33

Preparation of 2,6-bis[1-(5,6,7,8-tetrahydro-1-naphthylimino)ethyl]pyridine 2,6-Diacethylpyridine (0.54 g, 3.31 mmol) and 5,6,7,8-tetrahydro-1-naphthylimine (1.46 g, 10 mmol) were addedto a round-bottom flask with 20 ml of ethanol. 5 Drops of glacial acetic acid were added, the flask was sealed and the solution was stirred for 3 days. The solvent was removed under vacuum. The ligand was isolated after column chromatography (hexane/ethyl acetate=5/1) to provide a yield of 1.42 g.

EXAMPLE 34

Preparation of 2,6-bis[1-(5,6,7,8-tetrahydro-1-naphthylimino)ethyl]pyridine iron dichloride (complex 3)

The ligand from example 33 (0.65 g, 1.54 mmol) was dissolved in $CH_2Cl_2$ (20 ml). $FeCl_2.4H_2O$ (0.35 g, 1.76 mmol) 20 ml of methanol was added to the ligand solution. The reaction mixture was stirred for 2 hours at room temperature. A dark blue-green suspension was formed. The solvent was removed under vacuum and the solid residue was crystallized from $CH_2Cl_2$/hexane to give the desired complex 3.

EXAMPLE 35

Preparation of 2,6-dibenzoylpyridine 2,6-pyridinedicarbonyl dichloride (6.12 g, 30.0 mmol) in benzene (60 ml) was added to $AlCl_3$ (12.2 g, 91.5 mmol) in benzene (50 ml). The reaction mixture was refluxed for 6 hours. The reaction was quenched with an aqueous $NaHCO_3$ solution. The organic layer was extracted with ether (3×70 ml) and dried over $Na_2SO_4$ and the solvent was distilled under low vacuum. 2,6-benzoylpyridine was isolated as a solid (90%).

EXAMPLE 36

Preparation of 2,6-di(2,4,6-mesityloyl)pyridine 2,6-pyridinedicarbonyl dichloride (6.12 g, 30.0 mmol) in mesitylene (60 ml) was added to $AMCl_3$ (12.2 g, 91.5 mmol). The reaction mixture was refluxed for 6 hours. The reaction was quenched with an aqueous $NaHCO_3$ solution. The organic layer was extracted with ether (3×70 ml) and dried over $Na_2SO_4$ and the solvent was distilled under low vacuum. The column chromatography (hexane/ethyl acetate=5:1) gave a solid product. $^1H$ NMR and GC analysis indicated the presence of several products. $^1H$ NMR ($CDCl_3$) (signals belong to desired pyridine): δ 8.3–6.5 ($H_{arom}$, $H_{pyridine}$), 2.31 (s, 6H, Me), 1.98 (s, 6H, Me), 1.81 (s, 6H,Me).

EXAMPLE 37

Dibenzoylbis(1-naphthylimino)pyridine $TiCl_4$ (0.4 ml, 3.5 mmol) in toluene (20 ml) was added to a mixture of dibenzoylpyridine (0.91 g, 3.2 mmol) and 1-naphthylamine (2.90 g, 17 mmol) in toluene (50 ml) at 0° C. After the addition was complete, the reaction was stirred at room temperature for 1 hour and then under refluxed for 3 hours. The solid was filtered and washed with toluene. The solvent was removed under vacuum. The ligand was isolated after the column chromatography (hexane/ethyl acetate=5/1) to produce a yield of 0.65 g.

EXAMPLE 38

2,6-Dibenzoylpyridine-bis(1'-naphthylimino)iron (II) Chloride (complex 6)

The ligand from example 37 (0.65 g, 1.08 mmol) was dissolved in THF (20 ml). $FeCl_2$ (140 mg, 1.10 mmol) was added to the ligand solution. The reaction mixture was stirred for 3 hours at room temperature. A dark blue-green suspension was formed. The solvent was removed under vacuum, and the solid residue was crystallized from $CH_2Cl_2$/hexane to give complex 6.

EXAMPLE 39

Dibenzoylbis(2'-methyl-1'-naphthylimino)pyridine $TiCl_4$ (0.4 ml, 3.5 mmol) in toluene (20 ml) was added to a mixture of dibenzoylpyridine (0.91 g, 3.2 mmol) and 2-methyl-1-naphthylamine (2.26 g, 19 mmol) in toluene (50 ml) at 0° C. After the addition was complete, the reaction was stirred at room temperature for 1 hour and then under reflux for 5 hours. The solid was filtered and washed with toluene. The solvent was removed under vacuum. The ligand was isolated after column chromatography (hexane/ethyl acetate=5/1) to provide a yield of 0.60 g.

EXAMPLE 40

2,6-Dibenzoylpyridine-bis(2'-methyl-1'-naphthylimino)iron (II) Chloride (complex 7)

The ligand from example 39 (0.27 g, 0.43 mmol) was dissolved in THF (20 ml). $FeCl_2$ (60 mg, 0.47 mmol) and added to the ligand solution. The reaction mixture was stirred overnight at room temperature. A dark blue-green suspension was formed. The solvent was removed under vacuum and the solid residue was crystallized from $CH_2Cl_2$/hexane to give complex 7.

EXAMPLE 41

Dibenzoylbis(5',6',7',8'-tetrahydro-1'-naphthylimino) pyridine $TiCl_4$ (0.4 ml, 3.5 mmol) in toluene (20 ml) was added to a mixture of dibenzoylpyridine (0.84 g, 2.9 mmol) and 4,5,6,7-tetrahydro-1-naphthylamine (2.64 g, 18 mmol) in toluene (70 ml) at 0° C. After the addition was complete, the reaction was stirred at room temperature for 1 hour and then under reflux for 4 hours. The solid was filtered and washed with toluene. The solvent was removed under vacuum. The ligand was isolated after column chromatography (hexane/ethyl acetate=5/1) to provide a yield of 0.69 g.

EXAMPLE 42

2,6-Dibenzoylpyridine-bis(5',6',7',8')-tetrahydro-1'-naphthylimino)iron (II) Chloride (complex 9)

The ligand from example 41 (0.65 g, 1.06 mmol) was dissolved in THF (20 ml). $FeCl_2$ (150 mg, 1.18 mmol) was added to the ligand solution. The reaction mixture was stirred overnight at room temperature. A dark blue-green suspension was formed. The solvent was removed under vacuum and the solid residue was crystallized from $CH_2Cl_2$/hexane to give complex 9.

EXAMPLE 43

2,6-bis[1-(9-phenanthrene-imino)ethyl]pyridine 2,6-Diacethylpyridine (0.25 g, 1.53 mmol) and 9-aminophenanthrene (0.59 g, 3.06 mmol) were added to a round-bottom flask with 20 ml of ethanol. 5 Drops of glacial acetic acid were added, the flask was sealed and the solution was refluxed for 72 hours. The solvent was removed under vacuum. Toluene (15 ml) and molecular selves were added. The reaction mixture was heated under reflux for 3 days. The solvent was removed under the vacuum, and the solid residue was crystallized from $CH_2Cl_2$/hexane to give the desired ligand.

EXAMPLE 44

Preparation of Iron bis-imine (9-phenanthrene) (Complex 10)

Bis-imine (9-phenanthrene) ligand from example 43 (0.30 g, 0.58 mmol)) and iron dichloride (II) (75 mg) in THF (10 ml) were stirred for 4 hours at 30° C. The solvent was removed under vacuum. The solid residue was crystallized from $CH_2Cl_2$/hexane to give complex 10.

EXAMPLE 45

Preparation of 2-[1-(2,6-dimethylphenylimino (ethyl]-6-[1-(2,6-diphenyl phenylimino)ethyl]pyridine 2-Acetyl-6-[1-(2,6-diphenylphenylimino)ethyl]pyridine (1.70 g, 4.36 mmol), 2,6-methylaniline (2.3 g) and a catalytic amount of p-toluenesulfonic acid monohydtrate in benzene (30 ml) were heated under reflux for two days. The solvent was removed under vacuum. Double crystallization $CH_2Cl_2$/pentane (1:3) gave the desired ligand (0.33 g). $^1H$ NMR ($CDCl_3$): δ 8.34 (d, 1H, $H_{pyr}$), 8.08 (d, 1H, $H_{pyr}$), 7.77 (t, 1H, $H_{pyr}$) 7.5–6.9 (16H, $H_{arom}$), 2.06 (s, 3H, $CH_3$—C=N), 2.00 (s, 6H, $CH_3$), 1.89 (s, 3H, $CH_3$—C=N).

EXAMPLE 46

Preparation of 2-[1-(2,6-dimethylphenylimino (ethyl]-6-[1-(2,6-diphenyl phenylimino)ethyl]pyridine iron dichloride (complex 13)

The same procedure as in example 40 was repeated except the reaction was conducted by using the ligand from example 45.

EXAMPLE 47

Preparation of 2-[1-(2,4,6-trimethylphenylimino (ethyl]-6-[1-(2,6-diphenyl phenylimino)ethyl]pyridine The same procedure as in example 45 was repeated except that the reaction was conducted by using trimethylaniline. $^1H$ NMR ($CD_2Cl_2$): δ 8.33 (d, 1H, $H_{pyr}$), 8.10 (d, 1H, $H_{pyr}$), 7.81 (t, 1H, $H_{pyr}$) 7.6–6.9 (15H, $H_{arom}$), 2.19 (s, 3H, $CH_3$ from Ph), 2.14 (s, 6H, $CH_3$, from Ph), 2.06 (s, 3H, $CH_3$—C=N), 1.92 (s, 3H, $CH_3$—C=N).

EXAMPLE 48

Preparation of 2-[1-(2,4,6-trimethylphenylimino) ethyl]-6-[1-(2,6-diphenyl phenylimino)ethyl]pyridine iron dichloride (complex 14)

The same procedure as in example 40 was repeated except the reaction was conducted by using the ligand from example 47.

EXAMPLE 49

Preparation of Ligand: 2-[1-(2,6-diisopropylphenylimino(ethyl]-6-[1-(2,6-diphenyl phenylimino) ethyl]pyridine The same procedure as in example 45 was repeated except that reaction was conducted by using 2,6-diisopropylaniline. $^1H$ NMR ($CDCl_3$): δ 8.31 (d, 1H, $H_{pyr}$) 8.07 (d, 1H, $H_{pyr}$) 7.77 (t, 1H, $H_{pyr}$), 7.5–7.0 (16H, $H_{arom}$), 2.70 (sept, 2H, $CH(CH_3)_2$), 2.07 (s, 3H, $CH_3$—C=N), 1.89 (s, 3H, $CH_3$—C=N), 1.13 (t, 12H, $CH(CH_3)_2$).

EXAMPLE 50

Preparation of 2-[1-(2,6-diisopropylphenylimino (ethyl]-6-[1-(2,6-diphenyl phenylimino)ethyl]pyridine iron dichloride (complex 15)

The same procedure as in example 40 was repeated except the reaction was conducted by using the ligand from example 49.

EXAMPLE 51

Preparation of 2-[1-(2,6-dimethylphenylimino (ethyl]-6-[1-(2,6-bis(4-t-butylphenyl)imino)ethyl] pyridine The same procedure as in example 45 was repeated except that reaction was conducted by using 2-acetyl-6-[1-(2,6-bis (4-t-butylphenyl)imino)ethyl]pyridine and 2,6-dimethylaniline.

EXAMPLE 52

Preparation of 2-[1-(2,6-dimethylphenylimino (ethyl]-6-[1-(2,6-bis(4-t-butylphenyl)imino)ethyl] pyridine iron dichloride (complex 17)

The same procedure as in example 40 was repeated except the reaction was conducted by using the ligand from example 51.

EXAMPLE 53

Preparation of 2,6-Dibenzoylbis(2',6'-diisopropylphenylimino)pyridine $TiCl_4$ (0.4 ml, 3.5 mmol) in toluene (20 ml) was added to a mixture of dibenzoylpyridine (0.91 g, 3.2 mmol) (from example 35) and 2,6-diisopropylaniline (3.6 ml, 19 mmol) in toluene (50 ml) at 0° C. After the addition was complete, the reaction was stirred at room temperature for 1 hour and then under reflux for 10 hours. The solid was filtered and washed with toluene. The solvent was removed under vacuum. The residue was crystallized from methanol at −10° C. to give the ligand (0.80 g).

EXAMPLE 54

Preparation of 2,6-dibenzoylpyridine-bis(2',6'-diisopropylphenylimino)iron (II) chloride (complex 21)

The ligand from example 53 (0.50 g, 0.83 mmol) was dissolved in EtOH (20 ml). $FeCl_2 4H_2O$ (0.20 g, 1.0 mmol) was dissolved in EtOH (10 ml) and added to the ligand solution. The reaction mixture was stirred for 1 hour at room temperature. The solvent was removed under vacuum and THF (30 ml) was added. The reaction mixture was stirred overnight. A dark blue suspension was formed. The solvent was removed under vacuum and the solid residue was crystallized from $CH_2Cl_2$/hexane to give complex 21.

EXAMPLE 55

Preparation of 2,6-mesityllbis(2',6'-diisopropylphenylimino)pyridine

The same procedure as in example 53 was repeated except the reaction was conducted by using the compound from example 36.

EXAMPLE 56

Preparation of 2,6-mesityllbis(2',6'-diisopropylphenylimino)pyridine iron dichloride (complex 22)

The same procedure as in example 54 was repeated except the reaction was conducted by using the compound from example 55.

As indicated by the previously described experimental work, changes in symmetry of the catalyst component employed in the polymerization procedure can be used to effect changes in molecular weight of the polymer product. Thus, a first catalyst component of C2 symmetry can be used to produce a first polymer product, a second catalyst component can be employed to produce a second polymer product of higher molecular weight, and yet a third catalyst component of C2v symmetry can be employed to produce a third polymer product of yet higher molecular weight.

Further, within each symmetry class, the ligand structure can be varied to effect changes in molecular weight. Thus, the invention can be carried out employing first and second catalyst components having C2 symmetry as indicated by formulas (I) and (II) above. Here, the substituent $A_1$ of the second catalyst component can be bulkier than the substituent A of the first catalyst component to produce a second polymer product which has a lower molecular weight than the molecular weight of the first polymer product. In addition, control of molecular weight can be effected by changes in the aromaticity of the groups B and $B_2$. Thus, the second catalyst may exhibit groups $B_1'$ and $B_2'$ which has a lower aromaticity than the groups $B_1$ and $B_2$ of the first catalyst to produce a second polymer having a lower molecular weight than the molecular weight of the first polymer product.

For catalysts with Cs symmetry, first and second catalyst components can be employed in which the group $B_1'$ of the second catalyst component has a bulk which is greater than the group $B_1$ of the first catalyst component to produce a second polymer product which has a higher molecular weight than the molecular weight of the first polymer product. Similar changes can be made in the groups $B_2$ and $B_2'$ of the first and second catalyst component. Thus, group $B_2'$ of the second component can be formulated to have a bulk which is greater than the group $B_2$ of the first catalyst component to produce a second polymer product which has a higher molecular weight than the molecular weight of the first polymer product. Alternatively, or in addition, with a catalyst that has Cs symmetry, the group $B_1'$ of the second catalyst component can have a bulk that is greater than $B_1$ of the first catalyst component to produce a second polymer product which has a higher molecular weight than the molecular weight of the first polymer product.

Where the catalyst component has a C2v symmetry, the first and second catalyst components corresponding to formulas (I) and (II) can be employed in which the substituent A' of the second catalyst component is bulkier than the substituent A of the first catalyst component to produce a second polymer product which has a higher molecular weight than the molecular weight of the first polymer product.

The designations "first" and "second" with respect to polymerization procedures, catalyst or co-catalyst components, or polymer products are distinguishing adjectives and are not intended to designate the order or sequence in which the polymerization reactions are carried out. Thus, where a common reactor is employed, the second catalyst component may be introduced into the reactor to produce a second polymer product before or after the production of the first polymer product. Also, the polymerization procedures involving the first and second catalyst components, co-catalyst components and polymer products can be carried out in separate reactors, either concurrently or consecutively in the different reactors. Thus the "first" polymerization procedure may be carried out in a loop-type reactor, while the "second" polymerization can be carried out in a second loop-type reactor in conjunction with the same or different downstream processing procedures involving the treatment of polymer fluff in the extrusion and pelletization of the polymer product.

The polymer products, including ethylene homopolymers and ethylene-$C_{3+}$ alpha olefin copolymers, such as ethylene propylene copolymers, produced by the polymerization process of the present invention, can be used to produce a wide variety of end use products. Thus, the polymer products may be employed to produce blow-molded products or injection-molded products, such as bottles for milk, food, and detergents and the like, housewares, such as toys and pails and various extruded products. Such extruded products include film products for producing grocery and merchandise bags, packaging for food products, sheets for truck bed liners and luggage, shipping containers and bulk storage tanks. Large blow molded parts which can be produced include articles such as shipping containers and bulk storage tanks, and pipes, including high pressure pipes for use in various industrial applications such as for sewer pipes and pipes for gas, oil, and water transport applications. The polyethylene products are characterized by a high electrical resistivity and thus may be used in insulating applications such as insulating coatings on electrical wiring products. Molded ethylene homopolymer or copolymer products produced in accordance with the present invention can also be used to provide various automotive components by injection moldings, including, without limitation, automobile or truck dashboards and interior trim moldings. Where the polymer products produced in accordance with the present invention are used to make end use products by injection molding, various injection molded components may be made by injecting the polymer product into molds conforming to the shape of the article to be manufactured. As indicated, various articles may also be produced by blow molding to produce containers, bottles and the like, or by extrusion to form thin film products. In addition to films and the like, the ethylene homopolymer or copolymer product produced by the process of the present invention may be used to produce various fibers, meshes and textile materials as well as articles of apparel, such as gowns, masks, gloves and the like.

Having described specific embodiments of the present invention, it will be understood that modifications thereof may be suggested to those skilled in the art, and it is intended to cover all such modifications as fall within the scope of the appended claims.

What is claimed is:

1. An ethylene polymerization process comprising:
providing a transition metal catalyst component characterized by the formula:

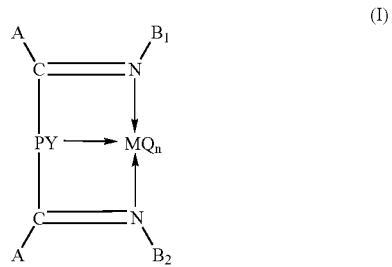

(I)

wherein M is a transition metal selected from Groups 4–11 of the Periodic Table of Elements; n is an integer of from 1–3; Q is a halogen or a $C_1$–$C_2$ alkyl group; PY is a pyridinyl group, which is coordinated with M through the nitrogen atom of said pyridinyl group; A is a methyl group, a phenyl group, or a substituted phenyl group;
wherein: said catalyst component has $C_2$ symmetry and $B_1$ and $B_2$ are the same and are a 1-naphthyl group, a substituted 1-naphthyl group, a 5,6,7,8-tetrahydro-1-naphthyl group or an anthracenyl group; or said catalyst component exhibits C2v symmetry and B1 and B2 are the same and are a phenyl group or a substituted phenyl group; or said catalyst exhibits Cs symmetry and $B_1$ is a phenyl or substituted phenyl group and $B_2$ is different from $B_1$ and is a polyphenyl group or terphenyl group, providing an activating co-catalyst component;
contacting said catalyst component and said co-catalyst component with ethylene in a polymerization reaction zone which is free of hydrogen or contains hydrogen in an amount which is less than 5 mol % of said ethylene under polymerization conditions to produce a polymer product by the polymerization of said ethylene; and
recovering said polymer product from said reaction zone.

2. The process of claim 1 wherein said polymer product is an ethylene homopolymer.

3. The process of claim 1 wherein said catalyst component and said co-catalyst component are contacted in said polymerization reaction zone with ethylene and a $C_{3+}$alpha olefin to produce a copolymer of ethylene and said $C_{3+}$alpha olefin.

4. The process of claim 3 wherein said $C_{3+}$ alpha olefin is propylene.

5. The process of claim 1 wherein said catalyst component comprises a mixture of two catalyst subcomponents, one of which exhibits C2, C2v or Cs symmetry and the other of which exhibits C2, C2v or Cs symmetry which is different from the symmetry of said first catalyst subcomponent.

6. The process of claim 1 wherein said catalyst component exhibits C2 symmetry and produces a polymer of lower molecular weight than the polymer produced by a corresponding catalyst component of C2 symmetry in which the substituents A are of a higher molecular weight than the substituents A of said catalyst component or in which the groups $B_1$ and $B_2$ are less aromatic than the groups $B_1$ and $B_2$ of said catalyst component.

7. The process of claim 1 wherein said catalyst component exhibits Cs symmetry and produces a polymer of higher molecular weight than the polymer produced by a corresponding catalyst component of Cs symmetry in which at least one of the groups $B_1$ and $B_2$ is less bulky than corresponding group $B_1$ or $B_2$ of said catalyst component.

8. The process of claim 1 wherein said catalyst component exhibits C2v symmetry and produces a polymer of higher molecular weight than the polymer produced by a corresponding catalyst component of C2v symmetry in which the substituents A are of a lower molecular weight than the substituents A of said catalyst component.

9. The process of claim 1 wherein said catalyst component exhibits C2 symmetry and the polymer product has a lower molecular weight than the polymer product produced by polymerization under the same polymerization conditions with a catalyst component having Cs or C2v symmetry.

10. The process of claim 1 wherein said catalyst component exhibits Cs symmetry and the polymer produced by the polymerization of said monomer in said reaction zone has a molecular weight which is greater than the molecular weight of the polymer product produced by polymerization under the same polymerization conditions with a catalyst component having C2 symmetry.

11. The process of claim 1 wherein said catalyst component exhibits C2v symmetry and said polymerization reaction zone is operated under conditions to produce a polymer product having a molecular weight greater than that produced by operation of the reaction zone under corresponding conditions with a catalyst having Cs symmetry.

12. The process of claim 1 wherein hydrogen is introduced into said reaction zone in an amount effective to increase the activity of said catalyst component relative to the activity of said catalyst component without the introduction of hydrogen.

13. The process of claim 11 wherein said hydrogen is introduced in an amount to provide a hydrogen/ethylene mole ratio within the range of 0.001–0.02.

14. The process of claims 1 wherein 1-hexene is introduced into said reaction zone in an amount effective to decrease the molecular weight of said polymer product relative to the polymer product produced by the polymerization of said ethylene in the absence of hexene.

15. The process of claim 1 wherein hydrogen and hexene are introduced into said polymerization reaction zone along with said ethylene.

16. The process of claim 1 wherein M is a transition metal selected from Groups 8–10 of the Periodic Table of Elements.

17. The process of claim 16 wherein M is iron or cobalt and n is 2.

18. The process of claim 17 wherein M is iron.

19. The process of claim 18 wherein Q is chlorine or bromine.

20. The process of claim 19 wherein Q is chlorine.

21. The process of claim 20 wherein the activating co-catalyst is an alkylalumoxane.

22. An ethylene polymerization process comprising:
providing a first transition metal catalyst component characterized by the formula:

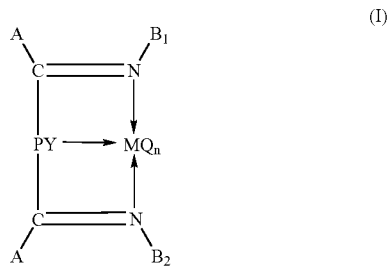

(I)

wherein M is a transition metal selected from Groups 4–11 of the Periodic Table of Elements; n is an integer of from 1–3; Q is a halogen or a $C_1$–$C_2$ alkyl group; PY is a pyridinyl group, which is coordinated with M through the nitrogen atom of said pyridinyl group; A is a methyl group, a phenyl group, or a substituted phenyl group;

wherein: said first catalyst component has $C_2$ symmetry and $B_1$ and $B_2$ are the same and are a 1-naphthyl group, a substituted 1-naphthyl group, a 5,6,7,8-tetrahydro-1-naphthyl group or an anthracenyl group; or said first catalyst component exhibits C2v symmetry and $B_1$ and $B_2$ are the same and are a phenyl group or a substituted phenyl group; or said first catalyst exhibits Cs symmetry and $B_1$ is a phenyl or substituted phenyl group and $B_2$ is different from $B_1$ and is a polyphenyl group or terphenyl group, providing a first activating co-catalyst component;

contacting said catalyst component and said cocatalyst component with ethylene in a polymerization reaction zone under polymerization conditions to produce a first polymer product by the polymerization of said ethylene;

recovering said first polymer product from said reaction zone;

providing a second transition metal catalyst component which is different than said first transition metal catalyst component and is characterized by the formula:

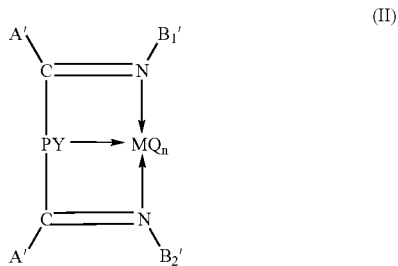

(II)

wherein M is a transition metal selected from Groups 4–11 of the Periodic Table of Elements; a is an integer of from 1–3; Q is a halogen or a $C_1$–$C_2$ alkyl group; PY is a pyridinyl group, which Is coordinated with M through the nitrogen atom of said pyridinyl group; A' is a methyl group, a phenyl group, or a substituted phenyl group;

wherein: said second catalyst component has $C_2$ symmetry and $B_1'$ and $B_2'$ are the same and are a 1-naphthyl group, a substituted 1-naphthyl group, a 5,6,7,8-tetrahydro-1-naphthyl group or an anthracenyl group; or said second catalyst component exhibits C2v symmetry and $B_1'$ and $B_2'$ are the same and are a phenyl group or a substituted phenyl group; or said second catalyst component exhibits Cs symmetry and $B_1'$ is a phenyl or substituted phenyl group and $B_2'$ is different from $B_1'$ and is a polyphenyl group or terphenyl group; providing a second activating co-catalyst component which may be the same as or different from said first co-catalyst component;

contacting said second catalyst component and said second co-catalyst component with ethylene in a polymerization reaction zone under polymerization conditions to produce a second polymer product by the polymerization of said ethylene, said second polymer product having a different molecular weight characteristic than said first polymer product; and recovering said second polymer product from said reaction zone.

23. The process of claim 22 wherein said first catalyst component has C2 symmetry and said second catalyst component has Cs or C2v symmetry to produce said second polymer which has a higher molecular weight than said first polymer product.

24. The process of claim 22 wherein said first catalyst component has C2 or Cs symmetry and said second catalyst component has C2v symmetry to produce said second polymer product which has a higher molecular weight than said first polymer product.

25. The process of claim 22 wherein said first and second catalyst components each have C2 symmetry and wherein the substituent A' of said second catalyst component is builder than the substituent A of said first catalyst component to produce a second polymer product which has a lower molecular weight than the molecular weight of said first polymer product.

26. The process of claim 22 wherein said first catalyst component and said second catalyst component each have C2 symmetry and said group $B_1'$ and $B_2'$ of said second catalyst component has a lower aromaticity than the groups $B_1$ and $B_2$ to produce a second polymer having a lower molecular weight than the molecular weight of said first polymer product.

27. The process of claim 22 wherein said first and second catalyst components each have C2v symmetry and the substituent A' of said second catalyst component is bulkier than the substituent A of said first catalyst component to produce a second polymer product which has a higher molecular weight than the molecular weight of said first polymer product.

28. The process of claim 22 wherein said first catalyst component and said second catalyst component each have Cs symmetry and said group $B_1'$ of said second catalyst component has a bulk which is greater than the group $B_1$ of said first catalyst component to produce a second polymer product which has a higher molecular weight than the molecular weight of said first polymer product.

29. The process of claim 22 wherein said first catalyst component and said second catalyst component each have Cs symmetry and said group $B_2'$ of said second catalyst component has a bulk which is greater than the group $B_2$ of said first catalyst component to produce a second polymer product which has a higher molecular weight than the molecular weight of said first polymer product.

30. An ethylene polymerization process comprising:
(a) providing a first transition metal catalyst component characterized by the formula:

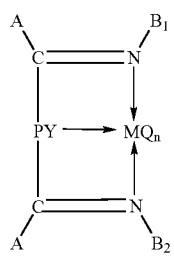

(I)

wherein M is a transition metal selected from Groups 4–11 of the Periodic Table of Elements; n is an integer of from 1–3; Q is a halogen or a $C_1$–$C_2$ alkyl group; PY is a pyridinyl group, which is coordinated with M through the nitrogen atom of said pyridinyl group; A is a methyl group, a phenyl group, or a substituted phenyl group;

wherein: said first catalyst component has $C_2$ symmetry and $B_1$ and $B_2$ are the same and are a 1-naphthyl group, a substituted 1-naphthyl group, a 5,6,7,8-tetrahydro-1-naphthyl group or an anthracenyl group; or said first catalyst component exhibits C2v symmetry and $B_1$ and $B_2$ are the same and are a phenyl group or a substituted phenyl group; or said first catalyst exhibits Cs symmetry and $B_1$ is a phenyl or substituted phenyl group and $B_2$ is different from $B_1$ and is a polyphenyl group or terphenyl group, providing a first activating co-catalyst component;

contacting said catalyst component and said co-catalyst component with ethylene in a polymerization reaction zone under polymerization conditions to produce a first polymer product by the polymerization of said ethylene;

recovering said first polymer product from said reaction zone;

providing a second transition metal catalyst component which is different than said first transition metal catalyst component and is characterized by the formula:

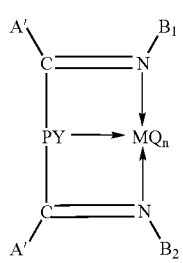

(I)

wherein M is a transition metal selected from Groups 4–11 of the Periodic Table of Elements; n is an integer of from 1–3; Q is a halogen or a $C_1$–$C_2$ alkyl group; PY is a pyridinyl group, which is coordinated with M through the nitrogen atom of said pyridinyl group; A' is a methyl group, a phenyl group, or a substituted phenyl group;

wherein: said second catalyst component has $C_2$ symmetry and $B_1'$ and $B_2'$ are the same and are a 1-naphthyl group, a substituted 1-naphthyl group, a 5,6,7,8-tetrahydro-1-naphthyl group or an anthracenyl group; or said second catalyst component exhibits C2v symmetry and $B_1'$ and $B_2'$ are the same and are a phenyl group or a substituted phenyl group; or said second catalyst component exhibits Cs symmetry and $B_1'$ is a phenyl or substituted phenyl group and $B_2'$ is different from $B_1'$ and is a polyphenyl group or terphenyl group, provided that said second catalyst component exhibits a different symmetry than said first catalyst component;

providing an activating co-catalyst component;

introducing ethylene, said first and second catalyst components, and at least one activating co-catalyst component into a polymerization reaction zone and operating said reaction zone under polymerization conditions to produce a polymer product by the polymerization of said ethylene; and recovering said second polymer product from said reaction tone.

31. The process of claim 30 wherein said first and second catalyst components are introduced into said polymerization reaction zone in a mixture of said first and second catalyst components.

32. The process of claim 30 wherein said first and second catalyst components are introduced into said polymerization reaction zone sequentially to produce two different polymer products.

33. A polymer product produced by the process of claim 1.

34. The polymer product of claim 32 comprising an ethylene homopolymer or an ethylene alphaolefin copolymer.

35. An article of manufacture formed from the polymer product of claim 34 where said product is a product produced by injection molding, a product produced by blow molding, or a product produced by extrusion.

36. The article of claim 35 comprising a film produced by extrusion molding.

\* \* \* \* \*